(12) United States Patent
Zhu et al.

(10) Patent No.: US 10,895,065 B2
(45) Date of Patent: Jan. 19, 2021

(54) SINGLE CAVITY DIVERTER VALVE

(71) Applicant: XIAMEN LOTA INTERNATIONAL CO., LTD., Xiamen (CN)

(72) Inventors: Chuanbao Zhu, Xiamen (CN); Xuedong Wang, Xiamen (CN); Jun Chen, Xiamen (CN); Jiangcheng Zhang, Xiamen (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 113 days.

(21) Appl. No.: 15/639,780

(22) Filed: Jun. 30, 2017

(65) Prior Publication Data

US 2019/0003160 A1    Jan. 3, 2019

(51) Int. Cl.
| | | |
|---|---|---|
| *E03C 1/02* | (2006.01) | |
| *F16K 31/60* | (2006.01) | |
| *F16K 25/00* | (2006.01) | |
| *F16K 27/06* | (2006.01) | |
| *F16K 11/085* | (2006.01) | |
| *F16K 5/04* | (2006.01) | |

(52) U.S. Cl.
CPC ............ *E03C 1/023* (2013.01); *F16K 5/0471* (2013.01); *F16K 11/0853* (2013.01); *F16K 25/005* (2013.01); *F16K 27/06* (2013.01); *F16K 27/065* (2013.01); *F16K 31/60* (2013.01)

(58) Field of Classification Search
CPC ........ F16K 25/005; F16K 27/06; F16K 31/60; E03C 1/0408; E03C 1/023; E03C 1/021; E03C 1/0409; E03C 1/06; B05B 1/1636; B05B 1/18; Y10T 137/8782; Y10T 137/86871

USPC ............................................. 137/876, 625.47
See application file for complete search history.

(56) References Cited

U.S. PATENT DOCUMENTS

| | | | | |
|---|---|---|---|---|
| 3,112,073 A | * | 11/1963 | Larson | ................ E03C 1/0408 239/446 |
| 4,145,004 A | | 3/1979 | Krizik | |
| 4,467,832 A | * | 8/1984 | Tamamori | ............ F16K 5/0207 137/625.47 |
| 4,754,928 A | | 7/1988 | Rogers et al. | |
| 4,982,760 A | * | 1/1991 | Mustaklem | ......... F16K 11/0853 137/559 |
| 5,090,624 A | | 2/1992 | Rogers | |
| 5,093,943 A | | 3/1992 | Wei | |
| 5,558,278 A | | 9/1996 | Gallorini | |

(Continued)

FOREIGN PATENT DOCUMENTS

| | | | | |
|---|---|---|---|---|
| CN | 206175729 U | | 5/2017 | |
| EP | 1167641 A2 | * | 1/2002 | ............... E03C 1/06 |
| EP | 1 293 712 A2 | | 3/2003 | |

OTHER PUBLICATIONS

Machine Translation of EP1167641A2, Inventors: Heimann, Bruno and Bischoff, Bernd (Year: 2002).*

*Primary Examiner* — Michael R Reid
(74) *Attorney, Agent, or Firm* — Barnes & Thornburg LLP (57) ABSTRACT

This invention relates to a diverter valve assembly, including a valve housing and a holder secured to the side of the housing for retaining a hand-held showerhead. The housing includes a water inlet port, and first and second water outlet ports. The valve housing includes a single internal valve cavity within which the hollow valve core rotates. The hollow valve core assists in diverting water within the valve cavity to one or both of the water outlet ports.

17 Claims, 7 Drawing Sheets

(56) References Cited

U.S. PATENT DOCUMENTS

| | | | |
|---|---|---|---|
| 5,901,387 A | 5/1999 | Fan | |
| 6,207,046 B1* | 3/2001 | Yamashita | B67D 1/07 |
| | | | 210/138 |
| 6,412,710 B1 | 7/2002 | Lin et al. | |
| 6,557,770 B2 | 5/2003 | Mace et al. | |
| 6,854,658 B1 | 2/2005 | Houghton et al. | |
| 6,959,731 B2 | 11/2005 | Bartkus et al. | |
| 7,080,790 B2 | 7/2006 | Lorch | |
| 7,114,515 B2 | 10/2006 | Sponheimer et al. | |
| 7,299,510 B2 | 11/2007 | Tsai | |
| 7,303,151 B2 | 12/2007 | Wu | |
| 7,458,112 B1* | 12/2008 | Yang | E03C 1/0408 |
| | | | 137/625.47 |
| 7,762,479 B2 | 7/2010 | Li | |
| 8,100,144 B2* | 1/2012 | Dirker | F01L 1/022 |
| | | | 137/625.32 |
| 9,151,025 B2 | 10/2015 | Zhu et al. | |
| 2004/0133975 A1* | 7/2004 | Ouyoung | E03C 1/0408 |
| | | | 4/676 |
| 2006/0016001 A1 | 1/2006 | Zhao | |
| 2006/0060678 A1 | 3/2006 | Mazzola | |
| 2013/0340854 A1* | 12/2013 | Quinn | E03C 1/0412 |
| | | | 137/343 |
| 2015/0316156 A1* | 11/2015 | Nagahama | F16K 5/0407 |
| | | | 137/625.46 |

\* cited by examiner

SINGLE CAVITY DIVERTER VALVE

TECHNICAL FIELD

This invention relates to a diverter valve assembly that is installed in a water discharging fixture, such as a faucet or showerhead. The diverter valve assembly includes an inlet port, first and second outlet ports, and a valve assembly for controlling fluid flow to the first and second outlet ports.

Background of the Invention

Diverter valves are in wide use in connection with the supply of water to faucets, showerheads, and similar water discharging fixtures. One common type of diverter valve currently in use includes a single inlet and two outlets. The single inlet is connected to a water supply hose, and water flows into the diverter valve through this hose and the inlet. The two outlets are connected to the water discharging fixtures. For example, one outlet may be connected to a wall-mounted, fixed showerhead, and the second outlet may be connected to a flex hose and a hand-held showerhead. A knob on the diverter can be swiveled between two or more positions. When the user moves the knob to a first position, water to the diverter valve is diverted to the fixed showerhead. When the user moves the knob to a second position, water to the diverter valve is directed to hand-held showerhead. Typically, an exterior portion of the diverter valve structure includes a holder to which the hand-held hose and showerhead may be secured.

This multifunctional diverter valve includes a spring in its interior valve portion. The spring facilitates movement of the diverter valve from its first position to its second position. In this interior location, the spring is constantly subjected to water flowing through the diverter valve. Minerals in the water, such as calcium and magnesium, can accumulate over time on the surface of the spring. The accumulated minerals can compromise the operation of the spring, and substantially shorten the life of the spring and the diverter valve.

With a view towards correcting at least some of these and other deficiencies in such prior diverter valves, the inventor engaged in research and then created the improved diverter valve described in this specification.

SUMMARY OF THE INVENTION

It is an object of the invention to provide an improved diverter valve. The valve of the invention has a simplified construction, and has parts that are less susceptible to rust and corrosion. The diverter valve of the invention is therefore likely to provide its user with a relatively longer service life The preferred diverter valve includes a valve housing. The diverter valve also includes a spray hose, and a holder for accommodating that spray hose when it is not being used. The housing includes a water inlet, a first water outlet, and a second water outlet.

A rotatable valve core is positioned within the housing, and a swivel knob is connected to this valve core. The user grasps and rotates the swivel knob, thereby rotating the valve core.

Components are secured to the valve core, and move with the valve core upon its rotation by means of the swivel knob. These components alternatively block fluid from entering, or permit fluid to enter, one or more of the water inlet, first water outlet, and second water outlet. In this way, rotation of the swivel knob and the resultant swiveling of the valve core serve to control the direction of water flow through the diverter valve.

The water inlet and the first and second water outlets are all in fluid communication with a valve cavity.

The valve core is hollow, and accommodates the flow of water through that valve core. A valve stem extends from this valve core, and that valve stem is secured to the swivel knob.

Accordingly, important features of the diverter valve of the invention is that a single valve stem extends from valve core; the valve core is hollow and permits water to flow through that valve core; there are one or more water holes and a baffle on the outer wall of the valve core, to permit fluid communication with the water inlet, the first water outlet, and the second water outlet; and there is a silicone seal between the valve core and the valve housing.

The silicone seal may be fixed on the valve housing. There is an orifice or hole in the silicone seal that may be positioned to be in fluid communication with a complementary orifice or hole on the valve housing.

The silicone seal may be fixed onto the valve core, and there is a hole on the silicone seal that may be positioned to be in fluid communication with a complementary water hole on the valve core.

The invention includes a baffle that is positioned within the valve cavity, and which decreases the force of the water into or out of that cavity.

The invention may also include a flow restrictor to conserve the amount of water used during a shower. A screen filter element may be positioned between the water inlet and the municipal or well water supply.

A spring positioner is housed within the swivel knob. The spring positioner helps facilitate movement of the swivel knob into any of several different positions, so that access to the water inlet or first and second water outlets can be enabled or stopped.

The swivel knob includes a two-piece arm assembly. Together, the two arms of this assembly capture the valve stem of the valve core.

The diverter valve further includes a holder. The holder includes a slot into which a portable showerhead and its hose may be secured.

The diverter valve of the invention also preferably includes a multi-piece positioning device that is disposed between the holder and the valve body. The positioning device rotates and secures the holder into a desired position relative to the valve body.

The positioning device includes a top mesh plate attached to the holder, and a bottom mesh plate attached to the first side of the valve body. Complementary or matching surfaces of the top mesh plate and the bottom mesh plate face each other. These matching faces may be radial grooves configured to engage each other.

The diverter includes a silicone seal that is positioned between valve core and the valve housing. As noted above, the valve core is hollow, and thus permits water to flow within that valve core. Ports and a baffle are disposed on the outer wall of the valve core, and these cooperate to direct and change water flow through the water inlet and the first and second water outlets.

This construction also avoids the corrosion problems inherent in water diverter valves that rely upon springs that reside within waterways. This feature extends the service life of the water diverter valve of the invention.

The water diverter valve of the invention also provides a number of flow paths through which water may flow, so as to supply a fixed showerhead, a hand-held showerhead, or both with water simultaneously.

DETAILED DESCRIPTION

One embodiment of the diverter valve 100 of the invention is shown in FIGS. 1-8.

Figure 1:
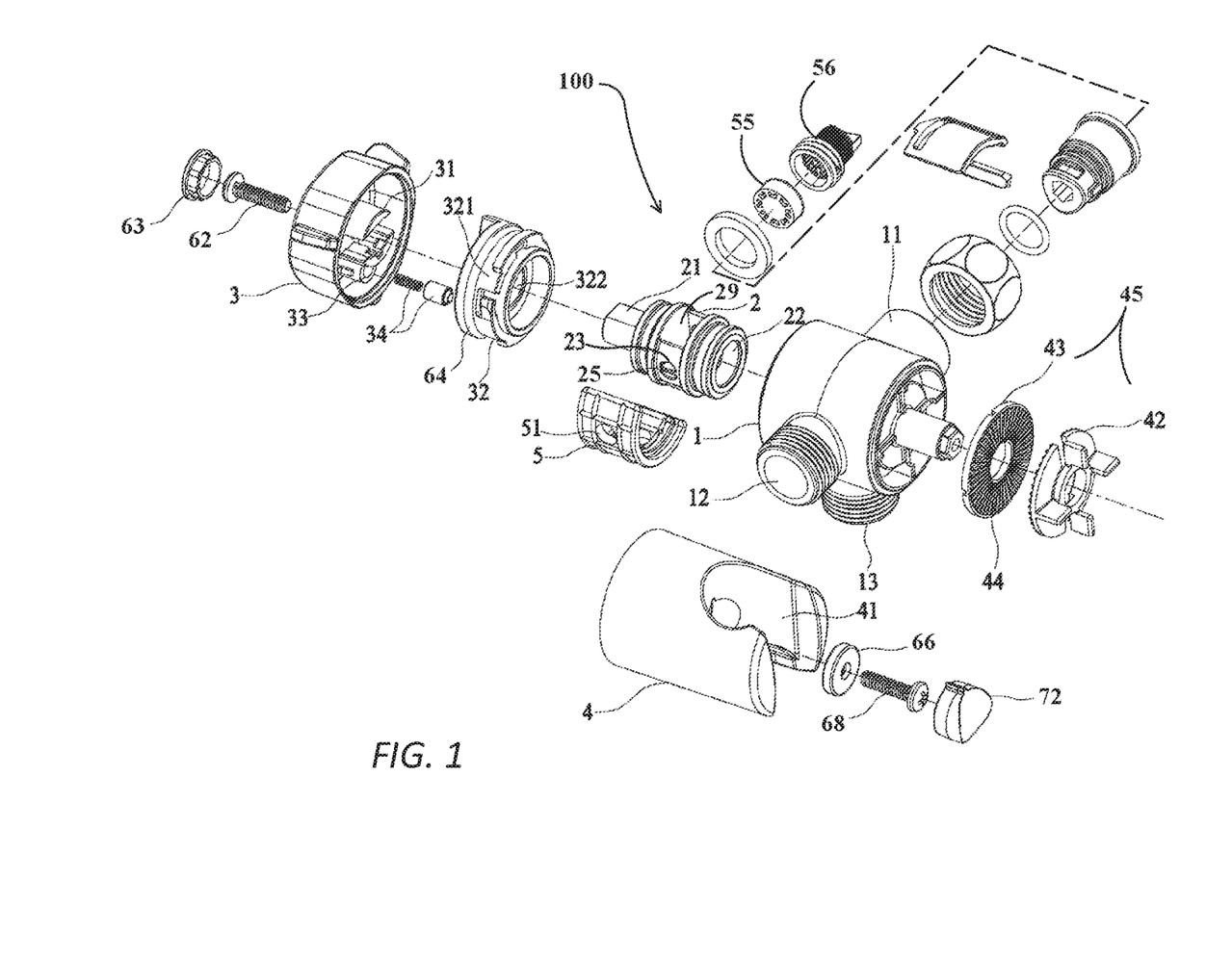
FIG. 1 is an exploded, perspective view of one preferred embodiment of the diverter valve of the invention.
Figure 2:
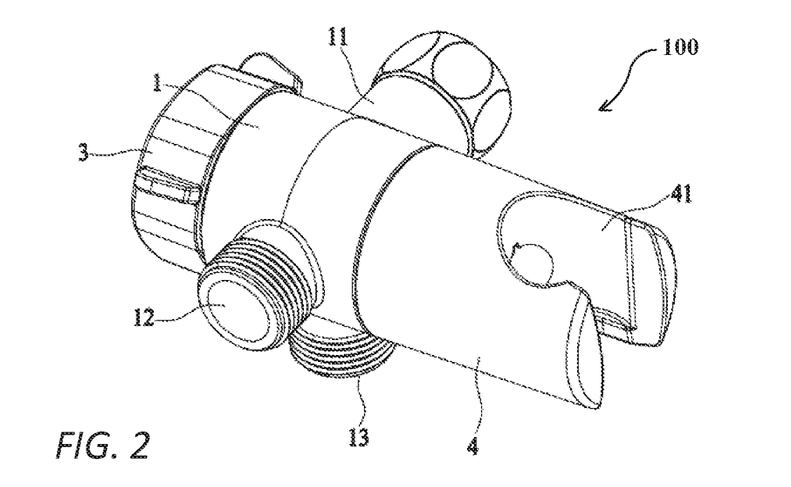
FIG. 2 is a perspective view of the assembled embodiment of FIG. 1.
Figure 3:
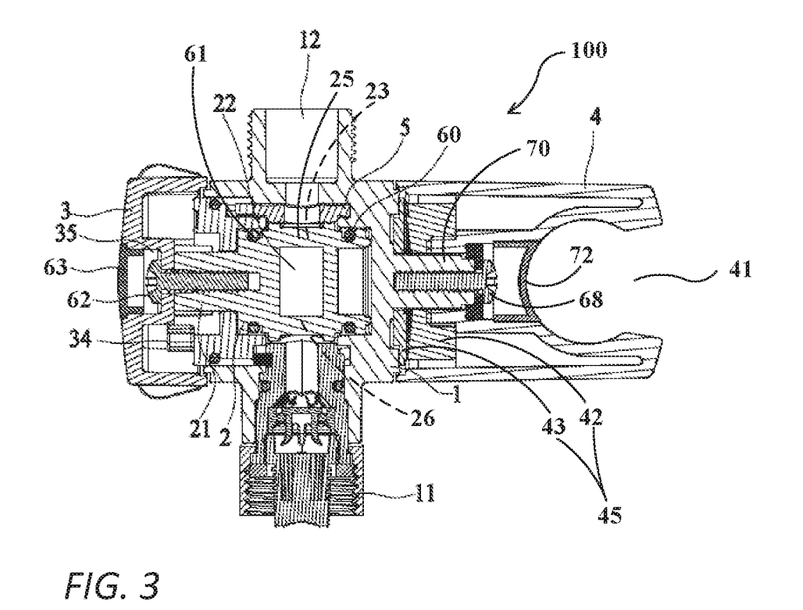
FIG. 3 is sectional view through the entire assembled embodiment of FIG. 2.

As may best be seen in FIG. 1, the diverter valve 100 of the invention includes a valve housing 1. FIGS. 1-3 depict a holder 4 that is secured to one side of the valve housing 1. As will be explained in more detail later, this holder 4 retains a hose and its related, hand-held showerhead to the valve housing 1 and the diverter valve 100 of the invention, when that showerhead is not in use.

As may be seen in FIGS. 1, 2, and 4-7, the valve housing 1 includes a water inlet 11, a first water outlet 12, and a second water outlet 13. Water enters the valve housing 1 through the water inlet 11. Water leaves the valve housing 1 through one or both of the first water outlet 12 and the second water outlet 13.

FIGS. 1 and 3 show a valve core 2. As will be discussed in more detail below, valve core 2 assists in the control of water flow within the valve housing 1. Valve core 2 rotates along its own axis within the valve housing 1.

The swivel knob 3 shown in FIGS. 1-3 is connected to the valve core 2. The user grasps on to the swivel knob 3 and turns it either clockwise or counterclockwise. The turning of the swivel knob 3 has the effect of rotating the valve core 2 to which the swivel knob 3 is secured. Thus, as will be explained in more detail below, the user's turning of the swivel knob 3 facilitates the movement of the water into the diverter valve 100 through water inlet 11, and out of the diverter valve 100 through first and second water outlets 12 and 13.

As may be seen in FIGS. 1-7, each of the water inlet 11 and the first 12 and second water outlets 13 of the valve housing 1 include external threads.

The external threads on the water inlet 11 serve to connect that water inlet 11 to, for example, the water supply tube 94 (see FIG. 8) through which municipal or well water is supplied to the valve housing 1 of the diverter valve 100.

Figure 8:
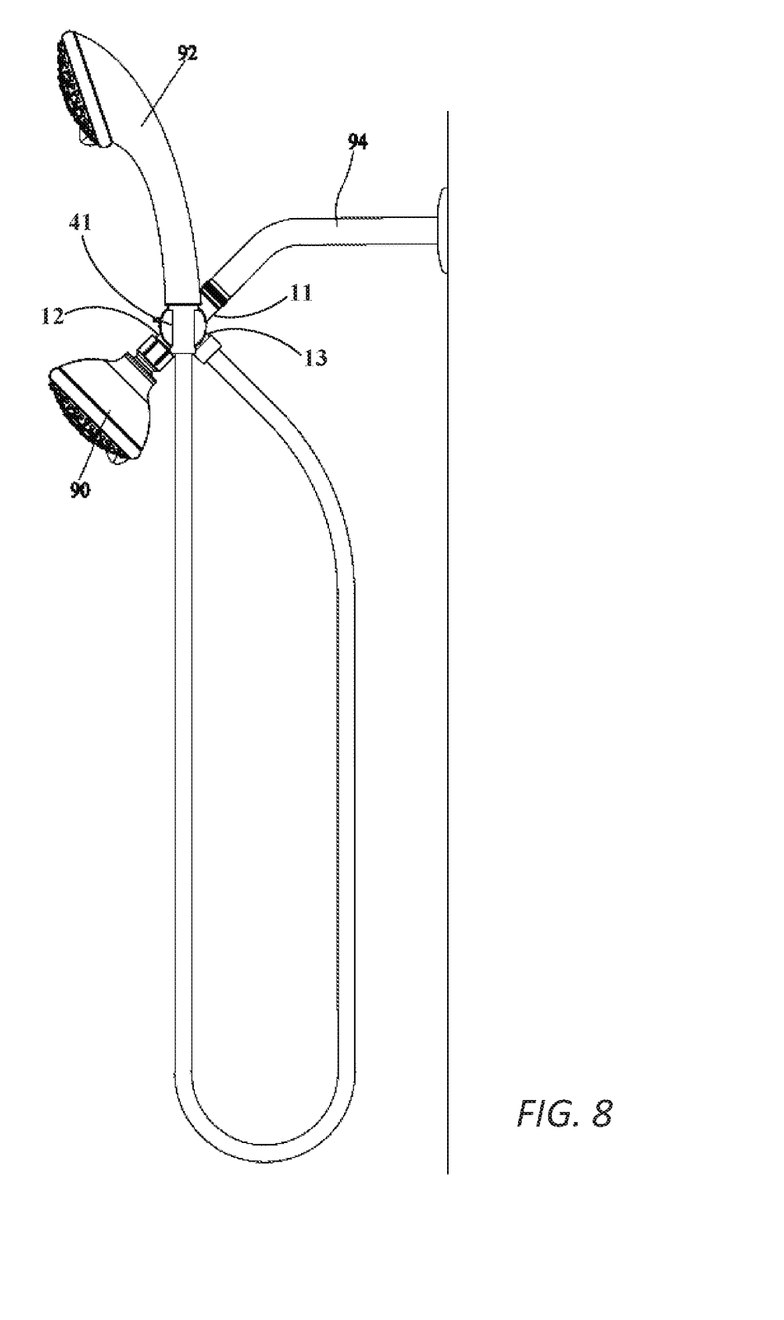
FIG. 8 is a side view of an embodiment of wall-mounted and hand-held shower assembly, being used with a diverter valve assembly in accordance with the invention.

As may also be seen from FIG. 8, the external threads on the first water outlet 12 and the second water outlet 13 serve to connect those outlets 12 and 13 to a stationary wall-mounted showerhead 90 and a portable hand-held showerhead 92, respectively.

Figure 4:
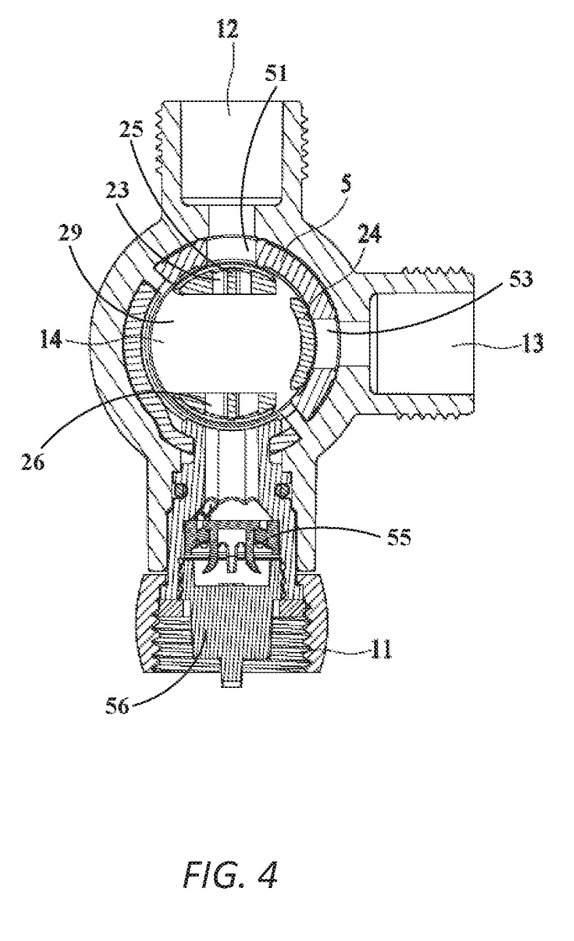
FIG. 4 is a sectional view of the valve housing portion of the assembled embodiment of FIG. 2, and configured to permit the flow of water through the water inlet, into the valve cavity of the valve housing, and out through the first water outlet.

Referring now to FIGS. 1 and 4, the valve housing 1 includes a flow restrictor 55 to conserve the amount of water used during a shower.

In addition, FIGS. 1 and 4 show a screen filter element 56 that is positioned between the water inlet 11 and the municipal or well water supply. The screen filter element 56 improves the quality of the water by removing impurities above the size of the mesh of that element 56.

A substantially spherically shaped valve cavity 14 is formed within the central inner portion of the valve housing 1. Water from the water inlet 11 enters this valve cavity 14. From there, the water exits the valve cavity 14 through one or both of the first water outlet 12 and second water outlet 13.

As may be seen in FIGS. 1 and 3-7, the diverter valve 100 of the invention includes a silicone sealing element 5, alternatively referred to as a silicone seal 5. As may best be seen in FIG. 1, the seal 5 is shell-like, i.e., it has the shape of a hollow half-cylinder. In the embodiment shown in FIGS. 4-7, this silicone seal 5 partially encircles the valve cavity 14. The silicone seal 5 is an important element of this invention, and enables the diverter valve 100 of the invention to have a single valve cavity 14. This single cavity 14 design distinguishes the diverter valve 100 from two-cavity or other multi-cavity diverter valves in the marketplace.

This silicone seal 5 includes so-called water "flow ways" 51 and 53 as shown in FIGS. 1 and 4. These water flow ways 51 and 53 are essentially orifices that are formed in the silicone seal 5. The water flow ways 51 and 53 or orifices in the silicone seal 5 facilitate or permit movement of water from the valve cavity 14 into the first water outlet 12 and into the second water outlet 13.

In this embodiment, the silicone seal 5 is stationary or fixed. The silicone seal 5 includes a pair of grooves. The valve core 2 abuts against the silicone seal 5. The valve core 2 also includes a pair of raised circumferential rings on its outer surface. As the valve core 2 rotates, these raised circumferential rings on the outer surface of the valve core 2 are guided within a pair of complementarily shaped grooves formed on the inner surface of the silicone seal 5.

It will be understood that in an alternate embodiment, the silicone seal 5 may be fixedly secured onto the valve core 2.

As indicated above, the valve core 2 is rotatable within the valve cavity 14. As may best be seen in FIG. 1, one end of the valve core 2 includes a valve stem 21. As will be explained in more detail below, this valve stem 21 is secured to swivel knob 3. As a result, when swivel knob 3 is rotated by the user, that knob 3 turns valve stem 21 and its valve core 2.

FIGS. 1 and 3 show the hollow construction of valve core 2. Due to this hollow construction, water may pass axially through that valve core 2.

More specifically, as may be seen in FIG. 3, the valve core 2 includes an internal passage 22 through which water may flow along the lengthwise axis of the valve core 2.

As may be seen in FIGS. 1 and 4-7, the outer surface of the valve core 2 also includes several water holes, including a first water port 23, a second water port 26 opposite the first water port 23, and a gap 29 extending between the first and second water ports 23, 26. Water within the valve core 2 can exit the core 2 in a radial direction.

As may best be seen in FIGS. 4-7, a baffle 24 that is a part of the valve core 2 is rotatable within the valve cavity 14 to direct flow of water into and out of that cavity 14. Specifically, as will be explained in more detail below, the baffle 24 works to alternatively block access to, or permit access to, the water inlet 11 and the first 12 and second water outlets 13. The baffle 24 is positioned opposite of the gap 29.

As may best be seen in FIG. 3, ring seals 60 and 61 are secured to a groove on each of the opposite outer ends of the valve core 2. These two ring seals 60 and 61 prevent the seepage or leaking of water out of the valve cavity 14.

As shown in FIG. 3 and FIG. 4, at one stage of the rotation of valve core 2, port 23 of the valve core 2 will be in alignment with the water inlet 11. At this stage, water from inlet 11 will go into the valve cavity 14 through flow channel 22, and will flow out of the valve cavity 14 through the first water outlet 12. Port 23 of the valve core 2 also aligns with port 51 of the silicone seal 5.

Figure 7:
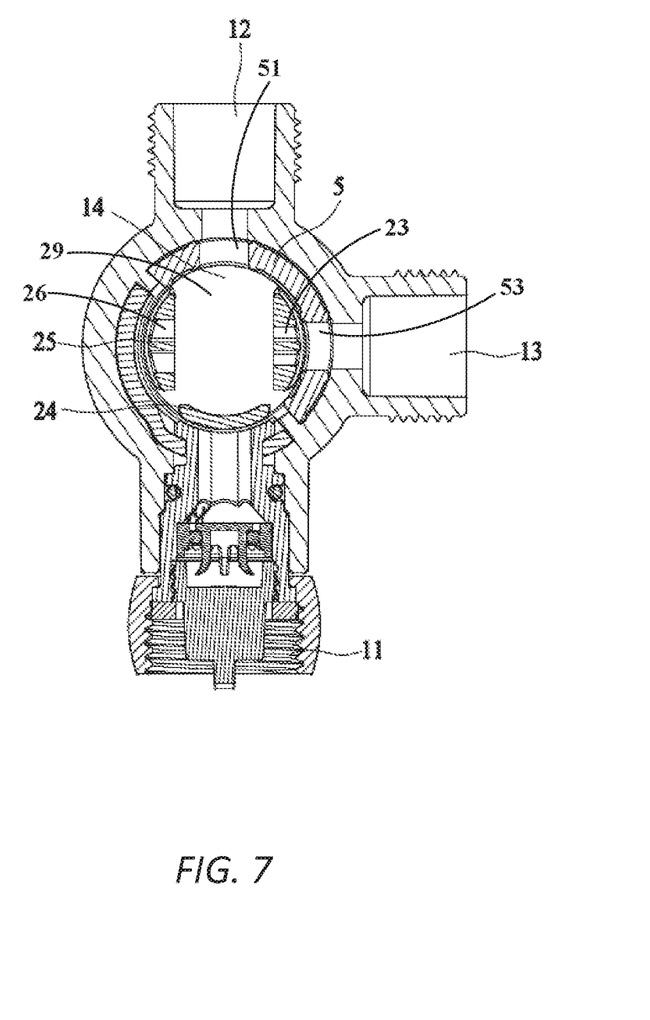
FIG. 7 is a sectional view of the valve housing portion of FIG. 4, but configured to prevent the flow of water into the valve housing portion.

As may best be seen in FIG. 7, when baffle 24 aligns with water inlet 11, access to water inlet 11 is closed, and no water will enter or exit valve cavity 14.

Each of the first and second water ports 23, 26 of the valve core 2 includes a rib 25 as shown in FIGS. 1 and 4. That rib 25 functions to strengthen the walls of the valve core 2 in that the rib 25 serves as a structural element of those walls. The rib 25 essentially bisects the first water port 23 and the second water port 26.

As briefly mentioned above, the swivel knob 3 is secured to the valve stem 21. To accomplish this securement, as may be seen in FIG. 1, the interior of the swivel knob 3 includes a two-piece arm assembly 31. Together, the two arms of this assembly 31 capture the valve stem 21 of the valve core 2.

As may also be seen in FIG. 1, a positioner element 32 is disposed between two-piece arm assembly 31 and valve stem 21. The positioner 32 has a generally hollow, cylindrical shape. The outer periphery of the positioner 32 may include one or more positioning slots 321.

The external surface of positioner 32 also includes a sealing o-ring 64. Finally, to accommodate the passage of the valve stem 21 through the positioner 32, the middle of the positioner 32 includes a central bore 322.

Positioner 32 is securely fixed to the valve housing 1.

Referring again to FIG. 1, the swivel knob 3 includes a barrel 33. This barrel 33 is positioned adjacent the lowermost arm of the arm assembly 31. This barrel 33 also abuts against the positioning slot 321 of the positioner 32.

A spring plunger 34 is housed within the barrel 33. The spring plunger 34 and the positioning slot 321 together comprise a spring positioner assembly (34, 321) that enables the valve core 2 to rotate into one of several different targeted positions.

As discussed briefly above, the swivel knob 3 is rotated by the user to direct water into and out of the valve cavity 14. In the configuration shown in FIG. 7, for example, the user has rotated the baffle 24 to a position adjacent the water inlet 11. In this position, the baffle 24 effectively prevents water from entering the valve cavity 14. In addition, because the baffle 24 blocks the entry of water into the valve cavity 14, there is no external water pressure impinging on any residual water within that valve cavity 14. As a result, when the baffle 24 is in the position of FIG. 7, no water will leave the valve cavity 14 through either of the first water outlet 12 or the second water outlet 13.

Referring now to FIG. 3, swivel knob 3 includes a slot 35 to accommodate screw 62. As may be seen in FIGS. 1 and 3, a friction-fit plug 63 is placed over slot 35 to cover screw 62 in a water-resistant manner. This plug 63 thus inhibits the rusting or corrosion of that screw 62 during operation and use of the diverter valve of the invention.

Referring to FIGS. 1-3 and 8, the holder 4 may have a U-shaped slot 41 into which the portable hand-held showerhead 92 may be secured. As may be seen in FIG. 1, a washer 66 and screw 68 directly attach the holder 4 to the protruding column 70 on the right side opening of the valve body 1.

FIG. 1 also depicts a multi-piece positioning device 45 that is disposed between the holder 4 and the valve body 1. The positioning device 45 rotates and secures the holder 4 into a desired position, i.e., a preferred angle, relative to the valve body 1. The positioning device 45 includes a top mesh plate 42 attached to the holder 4, and a bottom mesh plate 43 attached to the first side of the valve body 1. Matching surfaces of the top mesh plate 42 and the bottom mesh plate 43 face each other. These matching surfaces may be radial grooves 44 configured to engage each other. For example, a peak of each radial groove 44 on the top mesh plate 42 may engage with a valley of each complementary radial groove 44 on the bottom mesh plate 43, and vice versa.

The complementary radial grooves 44 provide a frictional engagement. However, if enough rotational force is applied to overcome the frictional engagement of the radial grooves, the top and bottom mesh plates 42, 43 will overcome their secure engagement, and will rotate relative to each other.

Optionally, the faces of the mesh plates 42, 43 could include convex peaks and concave grooves that work in coordination.

Finally, referring to the far right end of the holder 4 in FIG. 1, screw 68 may be covered by a friction-fit snap-on plug or cap 72, to inhibit rust.

The active positioning device 45 described above and shown in the FIGURES, comprising top and bottom mesh plates, is not the only form of device that can be used in connection with this invention. The active positioning device can comprise a pair of differently configured movable plates, or can comprise one or more plates that are fixed to the valve housing 1, with complementary gears and slots formed upon the respective plates.

The operation of the diverter valve may best be appreciated by a review of FIGS. 4-7.

In FIG. 4, the diverter valve 100 is configured to permit the flow of water through the water inlet 11, into the valve housing 1, and out through the first water outlet 12. The valve core 2 is shown in a first position with the second water port 26 aligned with the water inlet 11, the baffle 24 is aligned with flow way 53 and water outlet port 13, and the first water port 23 is aligned with flow way 51 and water outlet 12. The second water port 26 allows water from water inlet 11 to flow into cavity 14. The baffle 24 blocks access to water outlet port 13 and no water will exit valve cavity 14 through water outlet port 13. The first water port 23 allows water from cavity 14 to flow out of water outlet port 12 under pressure from the water entering cavity 14 through water inlet 11. In this way, water is directed to the fixed wall-mounted showerhead 90 only. Here, with only one outlet port 12 open, the rib 25 of the first water port 23 may also function to create backpressure in cavity 14 and enhance the sealing of baffle 24.

Figure 5:
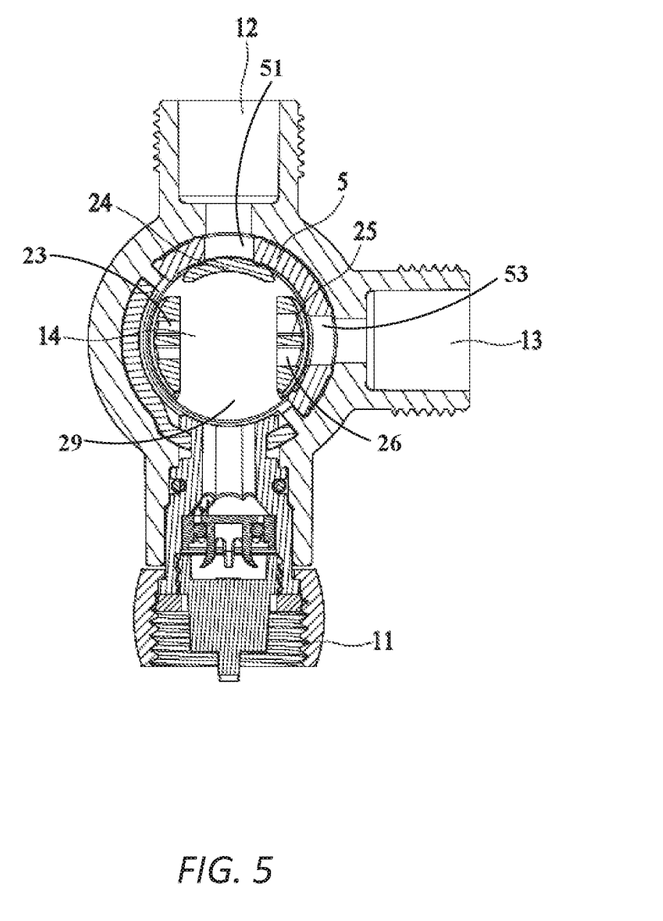
FIG. 5 is a sectional view of the valve housing portion of FIG. 4, but configured to permit the flow of water through the water inlet, into the valve housing, and out through the second water outlet.

In FIG. 5, the diverter valve 100 is configured to permit the flow of water through the water inlet 11, into the valve housing 1, and out through the second water outlet 13. The valve core 2 is shown in a second position with the second water port 26 aligned with flow way 53 and water outlet port 13, the baffle 24 is aligned with flow way 51 and water outlet port 12, and the gap 29 is aligned with water inlet 11. The gap 29 allows water from water inlet 11 to flow into cavity 14. The baffle 24 blocks access to water outlet port 12 and no water will exit valve cavity 14 through water outlet port 12. The second water port 26 allows water from cavity 14 to flow out of water outlet port 13 under pressure from the water entering cavity 14 through water inlet 11. In this way, water is directed to the hand-held showerhead 92 only. Here again, with only one outlet port 13 open, the rib 25 of the first water port 23 may also function to create backpressure in cavity 14 and enhance the sealing of baffle 24.

Figure 6:
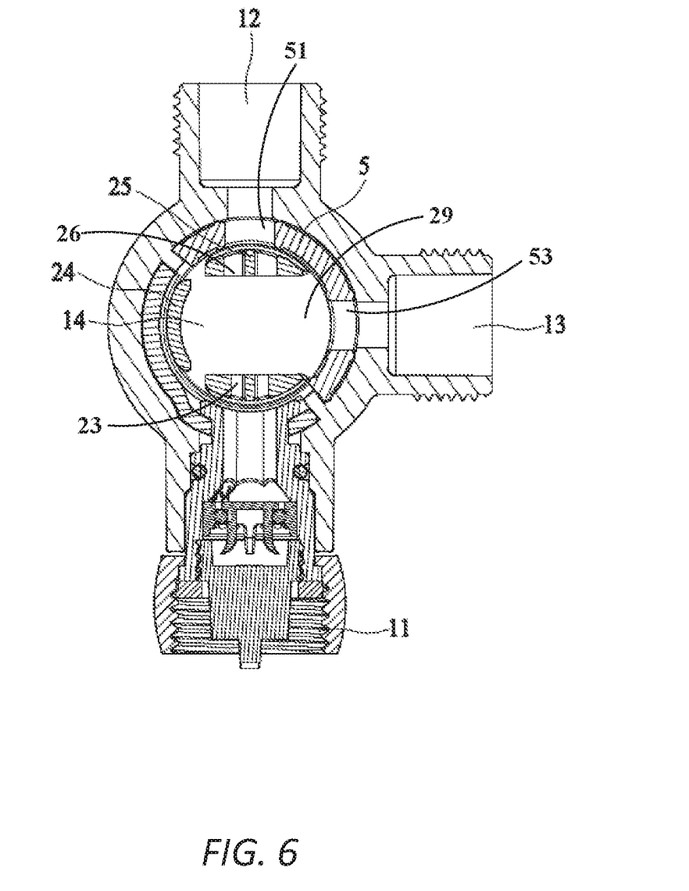
FIG. 6 is a sectional view of the valve housing portion of FIG. 4, but configured to permit the flow of water through the water inlet, into the valve housing, and out through both the first water outlet and the second water outlet.

In FIG. 6, the diverter valve 100 is configured to permit the flow of water through the water inlet 11, into the valve housing 1, and out through both the first water outlet 12 and the second water outlet 13. The valve core 2 is shown in a third position with the second water port 26 aligned with flow way 51 and water outlet port 12, the gap 29 is aligned with flow way 53 and water outlet port 13, and the first water port 23 is aligned with water inlet 11. The first water port 23 allows water from water inlet 11 to flow into cavity 14. The second water port 26 allows water from cavity 14 to flow out of water outlet port 12 under pressure from the water entering cavity 14 through water inlet 11. The gap 29 allows water from cavity 14 to flow out of water outlet port 13 under pressure from the water entering cavity 14 through water inlet 11. In this way, water is directed to both the wall-mounted showerhead 90 and the hand-held showerhead 92. Here, the rib 25 may also assist in distributing water to both water outlet ports 12 and 13.

Finally, in FIG. 7, the diverter valve is configured to prevent water from entering the valve cavity 14. The valve core 2 is shown in a fourth position with the baffle 24 aligned with water inlet 11 such that access to water inlet 11 is closed and no water will enter or exit valve cavity 14. Accordingly, no water can reach either the wall-mounted showerhead 90 or the hand-held showerhead 92.

The embodiment and FIGURES described above are to be considered as only illustrative of the principles of the invention. Since numerous modifications and changes will readily occur to those skilled in the art, it is not desired to limit the invention to the exact construction and operation shown and described. Accordingly, all suitable modifications and equivalents may be resorted to as falling within the scope of the invention.

The invention claimed is:

1. A diverter valve assembly, comprising:
   a valve housing having a water inlet, a first water outlet, and a second water outlet, the valve housing defining a valve cavity within the valve housing providing a fluid connection path between water inlet and the first and second water outlets;
   a holder attached to the valve housing for securing a hand-held showerhead;
   a hollow valve core positioned in the cavity of the valve housing and rotatable relative to the valve housing, the valve core defining an internal passage for the flow of water, and which further facilitates the movement of water through the valve housing, an outer wall of the valve core having a first water port, a second water port opposite the first water port, a baffle, a gap positioned opposite the baffle and opening into the internal passage, and ribs bisecting the first water port and the second water port;
   a swivel knob connected with the valve core for rotation of the valve core relative to the valve housing; and
   a silicone seal positioned between the valve core and the valve housing, the silicone seal at least partially encircling the cavity, the silicone seal having (i) a first flow way extending through the silicone seal and aligned with the first water outlet, and (ii) a second flow way extending through the silicone seal and aligned with the second water outlet,
   wherein the valve core is rotatable to at least a first position allowing water to flow through only the first water outlet, a second position allowing water to flow through only the second water outlet, a third position allowing water to flow through both the first water outlet and the second water outlet, and a fourth position blocking a flow of water from the water inlet into the cavity of the valve housing.

2. The diverter valve assembly of claim 1, wherein the silicone seal is fixedly secured to the valve housing.

3. The diverter valve assembly of claim 1, further comprising a flow restrictor and a filter between the water inlet and the first and second water outlets.

4. The diverter valve assembly of claim 1, further comprising a spring plunger housed within a barrel in the swivel knob; and a positioning slot for facilitating connection with the valve housing; wherein the spring plunger and the positioning slot facilitate the rotation of the valve core into the positions.

5. The diverter valve assembly of claim 1, further comprising a slot in the holder, and a movable positioning device between the holder and the valve housing.

6. The diverter valve assembly of claim 5, wherein the movable positioning device comprises a top and a bottom mesh plate between the holder and the valve housing, and wherein the top and bottom mesh plates include complementary surfaces that are securable to each other to effect rotation of the holder.

7. The diverter valve assembly of claim 5, wherein the movable positioning device comprises two plates, one secured to the holder and the other secured to the valve housing, and wherein the plates include complementary surfaces that are securable to each other to effect rotation of the holder.

8. The diverter valve assembly of claim 1, wherein:
   in the first position the second water port of the valve core is aligned with the water inlet, the baffle is aligned with the second water outlet, and the first water port is aligned with the first water outlet;
   in the second position the gap of the valve core is aligned with the water inlet, the second water port is aligned with the second water outlet, and the baffle is aligned with the first water outlet;
   in the third position the first water port of the valve core is aligned with the water inlet, the gap is aligned with the second water outlet, and the second water port is aligned with the first water outlet; and
   in the fourth position the baffle of the valve core is aligned with the water inlet.

9. A diverter valve assembly, comprising:
   a valve housing having a water inlet, a first water outlet, and a second water outlet, the valve housing defining a single valve cavity within the valve housing providing a fluid connection path between the water inlet and the first and second water outlets;
   a hollow valve core positioned in the cavity of the valve housing and rotatable relative to the valve housing, the valve core having an internal passage for the flow of water, and which further facilitates the movement of water through the valve housing, an outer wall of the valve core including a first water port, a second water port opposite the first water port, a baffle, and a gap positioned opposite the baffle and opening into the internal passage, each of the first water port and second water port having a rib extending across and splitting the respective first or second water port; and a silicone seal positioned between the valve core and the valve housing, the silicone seal at least partially encircling the cavity, the silicone seal having (i) a first flow way extending through the silicone seal and aligned with the first water outlet, and (ii) a second flow way extending through the silicone seal and aligned with the second water outlet, wherein the valve core is rotatable to at least a first position allowing water to flow through only the first water outlet, a second position allowing water to flow through only the second water outlet, a third position allowing water to flow through both the first water outlet and the second water outlet, and a fourth position blocking a flow of water from the water inlet into the cavity of the valve housing.

10. The diverter valve assembly of claim 9, wherein the silicone seal is fixed relative to the valve cavity.

11. The diverter valve assembly of claim 9, wherein:
in the first position the second water port of the valve core is aligned with the water inlet, the baffle is aligned with the second water outlet, and the first water port is aligned with the first water outlet;
in the second position the gap of the valve core is aligned with the water inlet, the second water port is aligned with the second water outlet, and the baffle is aligned with the first water outlet;
in the third position the first water port of the valve core is aligned with the water inlet, the gap is aligned with the second water outlet, and the second water port is aligned with the first water outlet; and
in the fourth position the baffle of the valve core is aligned with the water inlet.

12. The diverter valve assembly of claim 10, further comprising a flow restrictor and a filter between the water inlet and the first and second water outlets.

13. The diverter valve assembly of claim 10, further comprising a swivel knob connected with the valve core for rotation of the valve core relative to the valve housing.

14. The diverter valve assembly of claim 13, further comprising a spring plunger housed within a barrel in the swivel knob; and a positioning slot for facilitating connection with the valve housing; wherein the spring plunger and the positioning slot facilitate the rotation of the valve core into the positions.

15. The diverter valve assembly of claim 10, further comprising a holder attached to the valve housing for securing a hand-held showerhead, wherein a movable positioning device is positioned between the holder and the valve housing.

16. The diverter valve assembly of claim 15, wherein the movable positioning device comprises a top and a bottom mesh plate between the holder and the valve housing, and wherein the top and bottom mesh plates include complementary surfaces that are securable to each other to effect rotation of the holder.

17. The diverter valve assembly of claim 15, wherein the movable positioning device comprises two plates, one secured to the holder and the other secured to the valve housing, and wherein the plates include complementary surfaces that are securable to each other to effect rotation of the holder.

* * * * *